US012803043B2

(12) United States Patent
Chang et al.

(10) Patent No.: US 12,803,043 B2
(45) Date of Patent: Nov. 17, 2026

(54) ACTIVE PRESSURE CONTROL MECHANISM FOR IMPROVED BATTERY PERFORMANCE

(71) Applicant: GM Global Technology Operations LLC, Detroit, MI (US)

(72) Inventors: Insu Chang, Troy, MI (US); Jun-mo Kang, Ann Arbor, MI (US); Yongjie Zhu, Troy, MI (US); Chunhao J. Lee, Troy, MI (US); Chen-fang Chang, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 695 days.

(21) Appl. No.: 18/342,279

(22) Filed: Jun. 27, 2023

(65) Prior Publication Data

US 2025/0006976 A1 Jan. 2, 2025

(51) Int. Cl.
*H01M 10/04* (2006.01)
*F16C 3/06* (2006.01)

(52) U.S. Cl.
CPC ........... *H01M 10/0481* (2013.01); *F16C 3/06* (2013.01); *H01M 2200/20* (2013.01); *H01M 2220/20* (2013.01)

(58) Field of Classification Search
CPC ......... H01M 10/0468; H01M 10/0481; H01M 2220/20; H01M 2200/20; F16C 3/06
See application file for complete search history.

(56) References Cited

U.S. PATENT DOCUMENTS 11,223,062 B2 * 1/2022 Abe .................. H01M 10/0585
11,274,002 B2 * 3/2022 Abe ......................... B65H 3/48
11,283,100 B2 * 3/2022 Miyoshi .............. H01M 10/655
11,600,880 B2 * 3/2023 Laughlin ................. B60L 53/80
11,735,785 B2 * 8/2023 Miyoshi .............. H01M 50/103 429/120
12,266,774 B2 * 4/2025 Miyoshi .............. H01M 10/625
12,512,500 B2 * 12/2025 Ozaki ............... H01M 10/0404
12,614,750 B2 * 4/2026 Shao ...................... H01M 10/04
2021/0234211 A1 7/2021 Miyoshi et al.
2025/0006976 A1 * 1/2025 Chang ............... H01M 10/0481
2026/0103064 A1 * 4/2026 Barton ..................... B60K 1/04

FOREIGN PATENT DOCUMENTS

DE 102019211729 A1 2/2021
JP 2012256521 A 12/2012
WO 2011010651 A1 1/2011

OTHER PUBLICATIONS

DE Office Action for German Patent Application No. 10 2023 127 178.4, dated Mar. 18, 2024; 6 pages.

* cited by examiner

*Primary Examiner* — Jeffrey J Restifo

(74) *Attorney, Agent, or Firm* — CANTOR COLBURN LLP

(57) ABSTRACT

A vehicle includes a pressure control device for controlling a pressure at a battery of a vehicle and a method of controlling the pressure of the battery. A support plate is disposed at a first side of the battery. A pressure plate disposed at a second side of the battery opposite the first side. The pressure plate movable with respect to the support plate to control the pressure of the battery. A cam disposed at the pressure plate is configured to rotate to move the pressure plate with respect to the support plate. A cam shaft rotates the cam to move the pressure plate. A motor generates a rotation at the cam shaft.

20 Claims, 10 Drawing Sheets

ACTIVE PRESSURE CONTROL MECHANISM FOR IMPROVED BATTERY PERFORMANCE

INTRODUCTION

The subject disclosure relates to increasing a performance of a battery and, in particular, to controlling pressure applied to a battery that operates under high pressure conditions to increase its performance.

A battery is used to provide power to an electric vehicle. When the battery is operated under low pressure conditions, dendrites can grow between the anode and cathode of the battery. These dendrites limit the life span and effectiveness of the battery. This is particularly true for a Lithium Metal Battery (LMB). However, dendrite growth can be reduced by operating the battery under high pressure conditions. Accordingly, it is desirable to provide a method and apparatus for applying high pressure to the battery during its operation.

SUMMARY

In one exemplary embodiment, a pressure control device for controlling a pressure at a battery of a vehicle is disclosed. The pressure control device includes a support plate at a first side of the battery, a pressure plate disposed at a second side of the battery opposite the first side, the pressure plate movable with respect to the support plate to control the pressure of the battery, a cam disposed at the pressure plate and configured to rotate to move the pressure plate with respect to the support plate, a cam shaft configured to rotate the cam to move the pressure plate, and a motor configured to generate a rotation at the cam shaft.

In addition to one or more of the features described herein, wherein the cam shaft is held at a fixed location with respect to the support plate. The motor generates the rotation at the cam shaft via one of a rotor shaft rotated by the motor and a flexible belt connecting the rotor shaft to the cam shaft to convert a rotation of the rotor shaft to the rotation of the cam shaft and the cam shaft acting as the rotor shaft of the motor. In an embodiment, the cam includes a first cam and a second cam, wherein the first cam and the second cam can be selectively rotated to apply a differential pressure across the pressure plate. The first cam is set at a first angle with respect to the cam shaft and the second cam is set at a second angle with respect to the cam shaft that is different from the first angle. The cam shaft includes a first section including the first cam and a second section including the second cam, wherein the first section and the second section are rotatable independently of each other. The cam includes a cam groove and the cam shaft includes a pin rail having a gear pin therein that is configured to move into the cam groove to engage the cam shaft to the cam. The pressure control device further includes a solenoid at the cam shaft for controlling an axial location of the gear pin with respect to the cam groove.

In another exemplary embodiment, a method of controlling an operation of a battery of an electric vehicle is disclosed. The method includes rotating a cam against a pressure plate to cause the pressure plate to move with respect to a support plate, wherein the battery is disposed between the support plate and the pressure plate and moving the pressure plate with respect to the support plate adjusts a pressure within the battery.

In addition to one or more of the features described herein, the method further includes rotating the cam by rotating a cam shaft at a fixed location with respect to the support plate. The method further includes rotating the cam shaft via a motor, wherein one of a rotor shaft rotated by the motor is coupled to the rotor shaft via flexible belt and the cam shaft is directly rotated by the motor. The cam includes a cam groove and the cam shaft includes a pin rail having a gear pin therein, further comprising moving the gear pin into the cam groove to engage the cam shaft to the cam. The cam includes a first cam and a second cam, further comprising applying a differential pressure across the pressure plate using the first cam and the second cam.

In yet another exemplary embodiment, a vehicle is disclosed. The vehicle includes a battery having a first side and a second side opposite the first side, and a pressure control device. The pressure control device includes a support plate at the first side of the battery, a pressure plate at the second side of the battery, the pressure plate movable with respect to the support plate to control a pressure of the battery, a cam disposed at the pressure plate and configured to rotate to move the pressure plate with respect to the support plate, a cam shaft configured to rotate the cam to move the pressure plate, and a motor configured to generate a rotation at the cam shaft.

In addition to one or more of the features described herein, the cam shaft is held at a fixed location with respect to the support plate. The motor generates the rotation at the cam shaft via one of a rotor shaft rotated by the motor and a flexible belt connecting the rotor shaft to the cam shaft to convert a rotation of the rotor shaft to the rotation of the cam shaft and the cam shaft acting as the rotor shaft of the motor. The cam includes a first cam and a second cam, wherein the first cam and the second cam can be selectively rotated to apply a differential pressure across the pressure plate. The first cam is set at a first angle with respect to the cam shaft and the second cam is set at a second angle with respect to the cam shaft that is different from the first angle. The cam includes a cam groove and the cam shaft includes a pin rail having a gear pin therein that is configured to move into the cam groove to engage the cam shaft to the cam. The vehicle further includes a solenoid at the cam shaft for controlling an axial location of the gear pin with respect to the cam groove.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
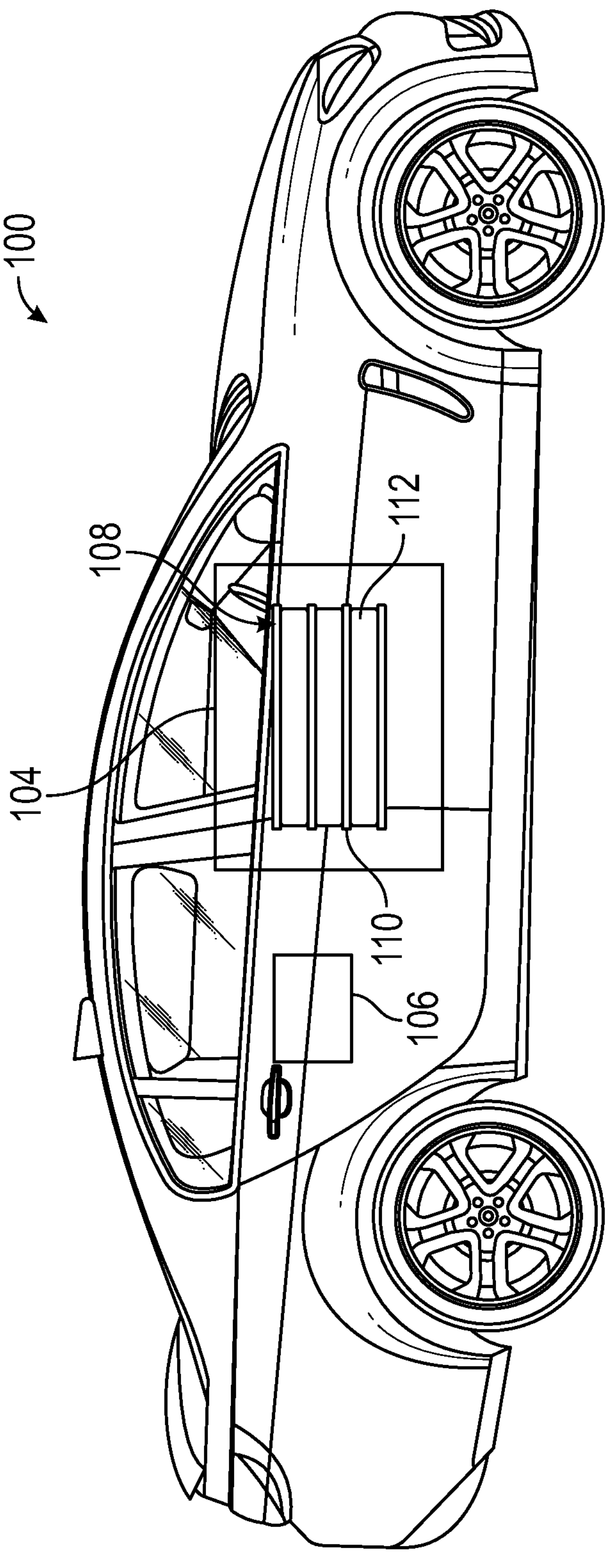
FIG. 1 shows an electric vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows an electric vehicle 100. The electric vehicle 100 includes an electric motor 102 a battery system 104 and a controller 106. The battery system 104 includes a battery 108 that includes anodes 110 and cathodes 112 that that are susceptible to forming dendrites during operation at standard pressures or ambient pressures. The dendrites diminish the quality of operation of the battery 108. In various embodiments, the battery 108 is any battery that requires high pressure conditions for operation, such as a lithium metal battery (LMB). The battery system 104 includes a device that applies a pressure to the battery 108 and is able to adjust or control the pressure as desired.

The controller 106 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 106 may include a non-transitory computer-readable medium that stores instructions which, when processed by one or more processors of the controller 106, implement a method of operating the battery system 104 so as to apply a pressure at the battery 108, as desired.

Figure 2:
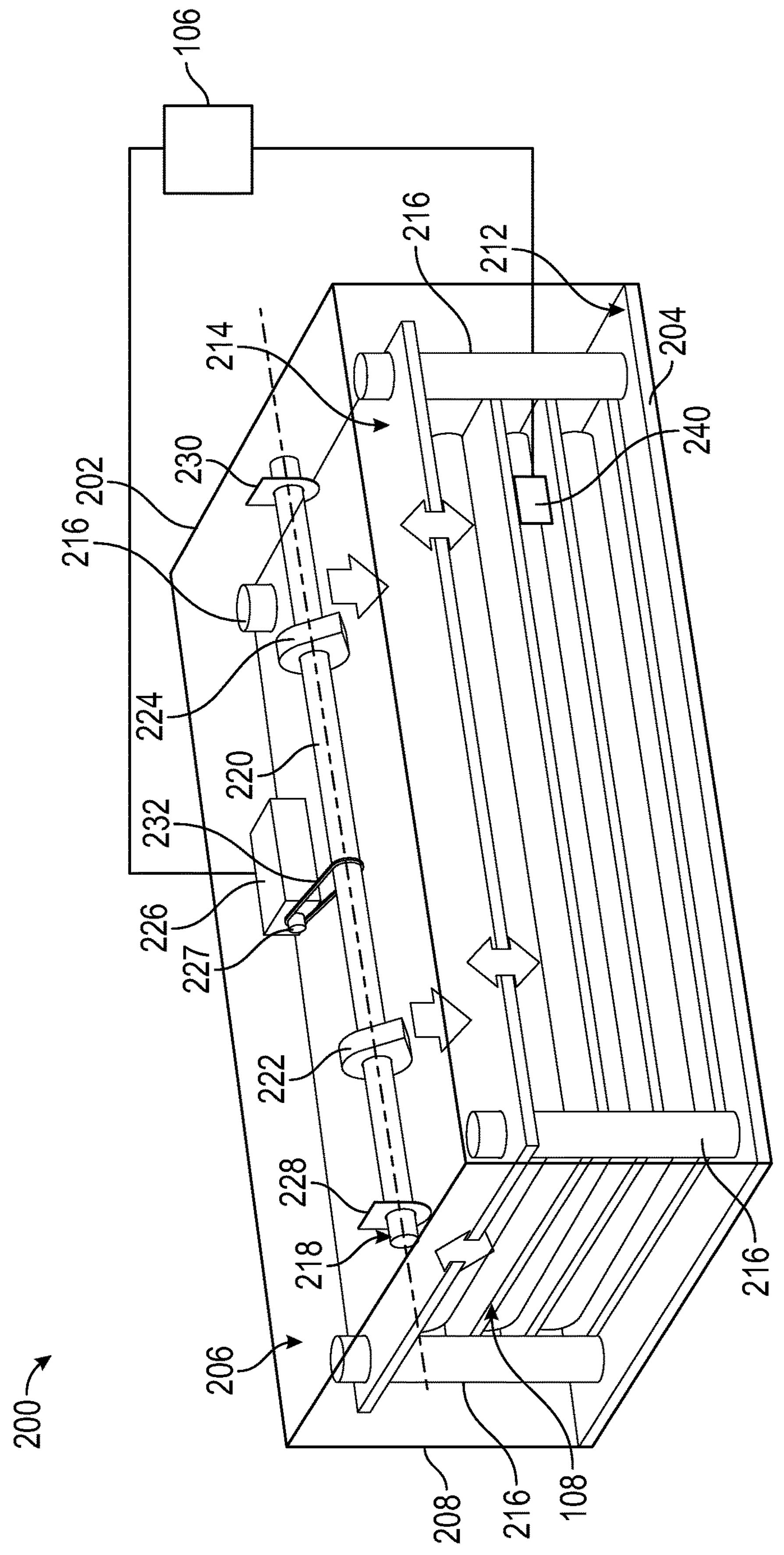
FIG. 2 shows a battery system for a battery of the vehicle in an exemplary embodiment.

FIG. 2 shows a battery system 200 for a battery 108 in an exemplary embodiment. The battery system 200 includes a housing 202 that houses the battery 108. The housing 202 can have a bottom surface 204, a top surface 206 and side walls 208. A pressure control device 210 for the battery 108 is disposed inside the housing 202. The pressure control device 210 includes a support plate 212 upon which the battery 108 is disposed, a pressure plate 214 that is movable with respect to the support plate, and posts 216 that guide a movement of the pressure plate in a direction either towards or away from the support plate. The support plate 212 can be the same as the bottom surface of the housing 202. The support plate 212 is placed against a first side of the battery 108, and the pressure plate 214 is placed against a second side of the battery 108 that is opposite the first side. The pressure plate 214 can be moved toward the support plate 212 to increase a pressure applied on the battery 108. The pressure plate 214 can be moved away from the support plate 212 to decrease the pressure applied on the battery 108.

A pressure plate control apparatus 218 controls a movement of the pressure plate 214 and thereby controls a pressure within the battery 108. The pressure plate control apparatus 218 includes a cam shaft 220 and one or more cams disposed on the cam shaft. For illustrative purposes, a first cam 222 and a second cam 224 are shown. A motor 226 is coupled to the cam shaft 220 and controls a rotation of the cam shaft. In an embodiment, the motor 226 includes a rotor shaft 227 and is coupled to the cam shaft 220 via a flexible belt 232 that converts the rotation of the rotor shaft to a rotation of the cam shaft. The motor 226 can be coupled to the housing 202.

The cam shaft 220 is coupled to at least one surface of the housing 202. The cam shaft 220 can be supported by bearings. A first bearing 228 and a second bearing 230 are shown for illustrative purposes. The bearings allow the cam shaft 220 to rotate freely. The bearings can be supported by the top surface 206 of the housing 202. Alternatively, the bearings can be located in one or more opposing side walls of the housing 202. The cam shaft 220 is held at a fixed location with respect to the support plate 212. Thus, rotating the cam shaft 220 (and the first cam 222 and second cam 224) changes the distance between the pressure plate 214 and the support plate 212, as illustrated in FIG. 3.

A pressure sensor 240 is configured to detect the pressure within the battery 108. The pressure can be sent to the controller 106 or other suitable processor. The controller 106 can control an operation of the motor based on the detected pressure within the battery 108.

Figure 3:
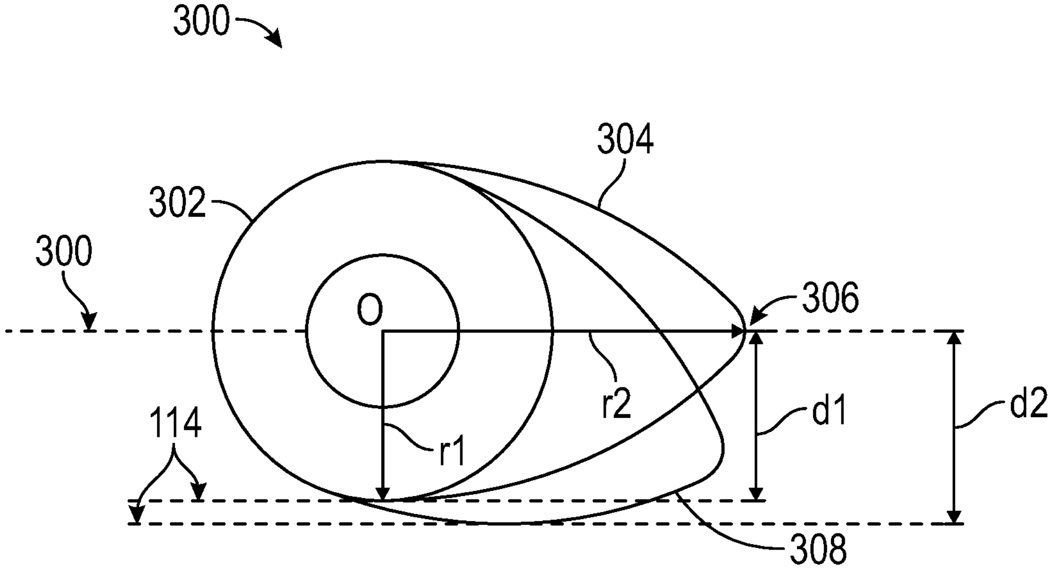
FIG. 3 show a side view of a cam in different rotational configurations.

FIG. 3 show a side view 300 of a cam (e.g., first cam 222) in different rotational configurations. The cam has a base circle 302 and a lobe 304 at one side. The base circle 302 has a first radius $r_1$ and the lobe 304 has a second radius $r_2$ great than the first radius $r_1$. The cam is placed such that a surface of the cam in contact with an outside surface of the pressure plate 214. The cam rotates about a center of rotation O, which is along the cam shaft 220 and is held stationary with respect to the support plate 212. A first rotational angle 306 is shown in which the cam is in contact with the pressure plate 214 at a point along the base circle 302. As a result, the pressure plate 214 is separated from the center of rotation O by a first distance $d_1$. A second rotational angle 308 is shown in which the cam is in contact with the pressure plate at a point along the lobe 304. As a result, the pressure plate 214 is separated from the center of rotation O by a second distance $d_2$ that is greater than $d_1$. Therefore, the pressure plate 214 is closer to the support plate 212 and applies greater pressure to the battery 108 when the cam is in the second rotational angle 308 than when in the first rotational angle 306.

Figure 4:
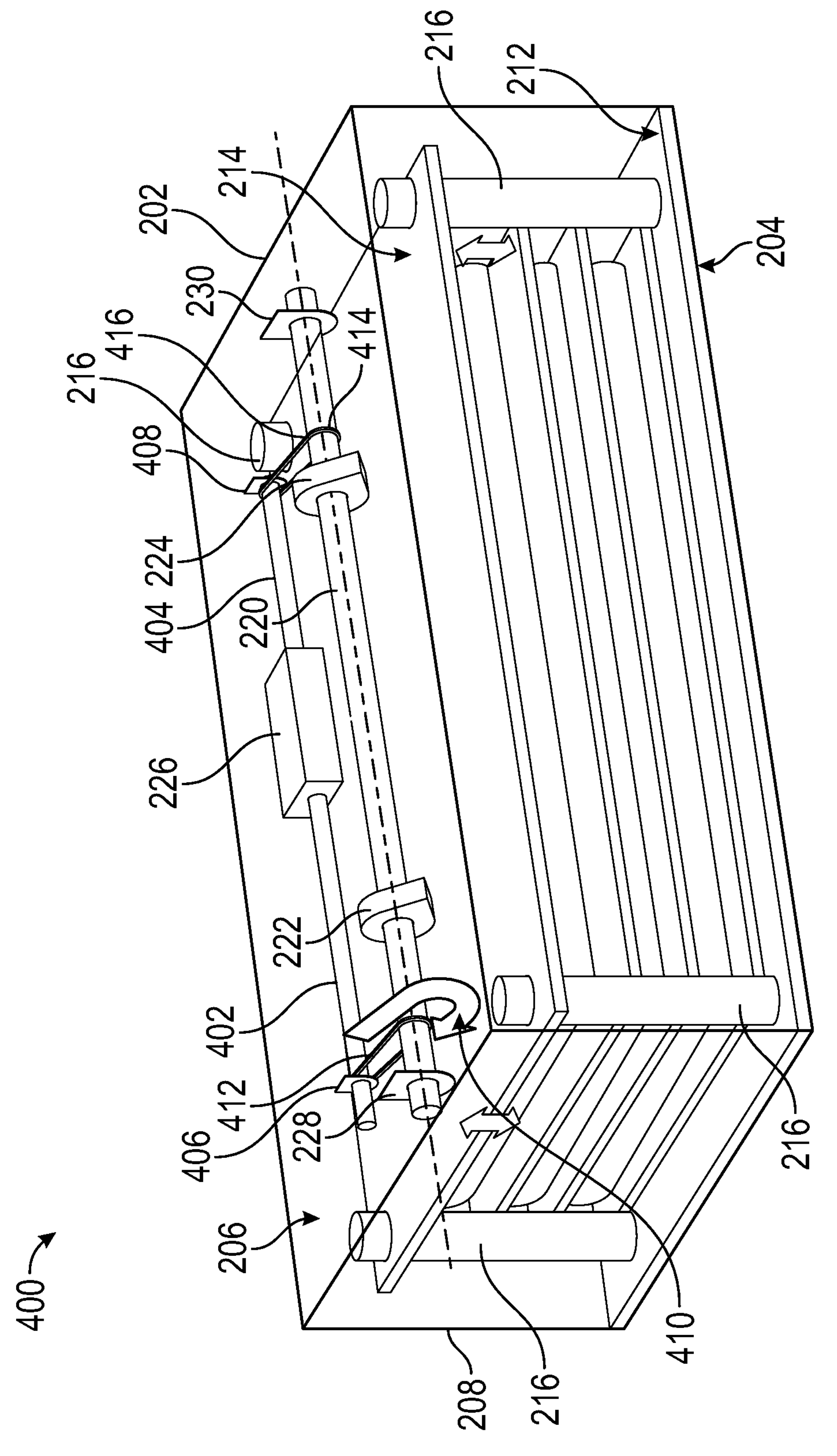
FIG. 4 shows a perspective view of the battery system in another embodiment.

FIG. 4 shows a perspective view 400 of the battery system 200 in another embodiment. The motor 226 has a first rotor shaft 402 that extends in one direction parallel to the cam shaft 220 and a second rotor shaft 404 that extends in an opposite direction parallel to the cam shaft. The first rotor shaft 402 can be supported at a first bearing 406 that is coupled to the top surface 206 and the second rotor shaft 404 can be supported at a second bearing 408 that is coupled to the top surface 206. The first rotor shaft 402 is coupled to the cam shaft 220 at a first location 410 via a first flexible belt 412 and the second rotor shaft 404 is coupled to the cam shaft 220 at a second location 414 via a second flexible belt 416.

Figure 5:
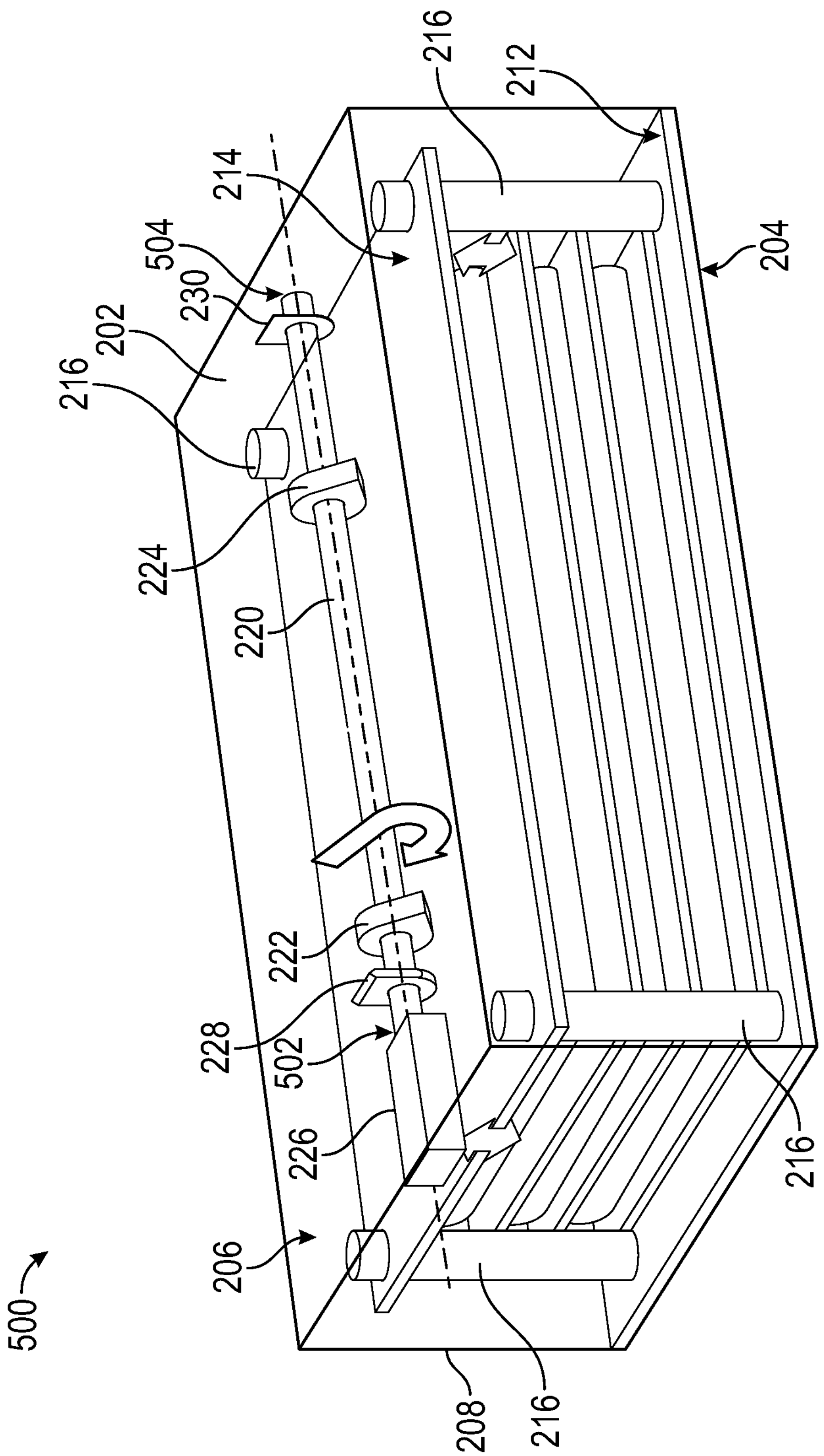
FIG. 5 shows a perspective view of the battery system in another embodiment.

FIG. 5 shows a perspective view 500 of the battery system 200 in another embodiment. The cam shaft 220 is coupled to the top surface 206 of the housing 202 by a first bearing 228 at a first end 502 and the second bearing 230 at the second end 504. The first end 502 of the cam shaft 220 passes through the center of the motor 226 to act as a rotor shaft of the motor. The motor 226 can therefore rotate the cam shaft 220 without the use of a flexible belt. The motor 226 can be attached to either a top surface 206 or a side wall 208 of the housing 202.

Figure 6:
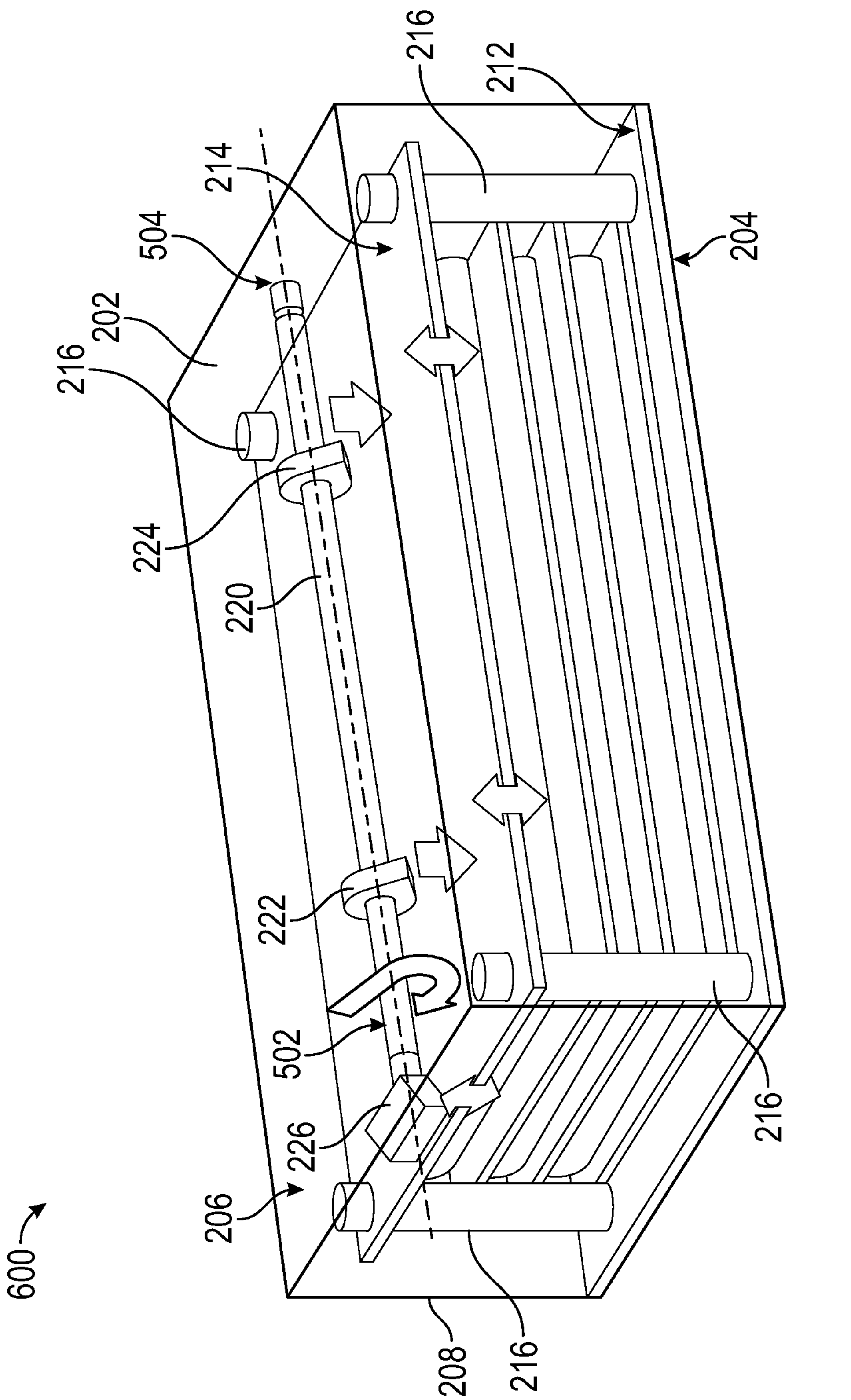
FIG. 6 shows a perspective view of the battery system in another embodiment.

FIG. 6 shows a perspective view 600 of the battery system 200 in another embodiment. A first end 502 of the cam shaft 220 passes through a center of the motor 226 to act as a rotor shaft of the motor. The motor 226 is attached to a side wall 208 of the housing 202. A second end 504 of the cam shaft 220 is coupled to an opposite side wall 208 of the housing 202.

Figure 7:
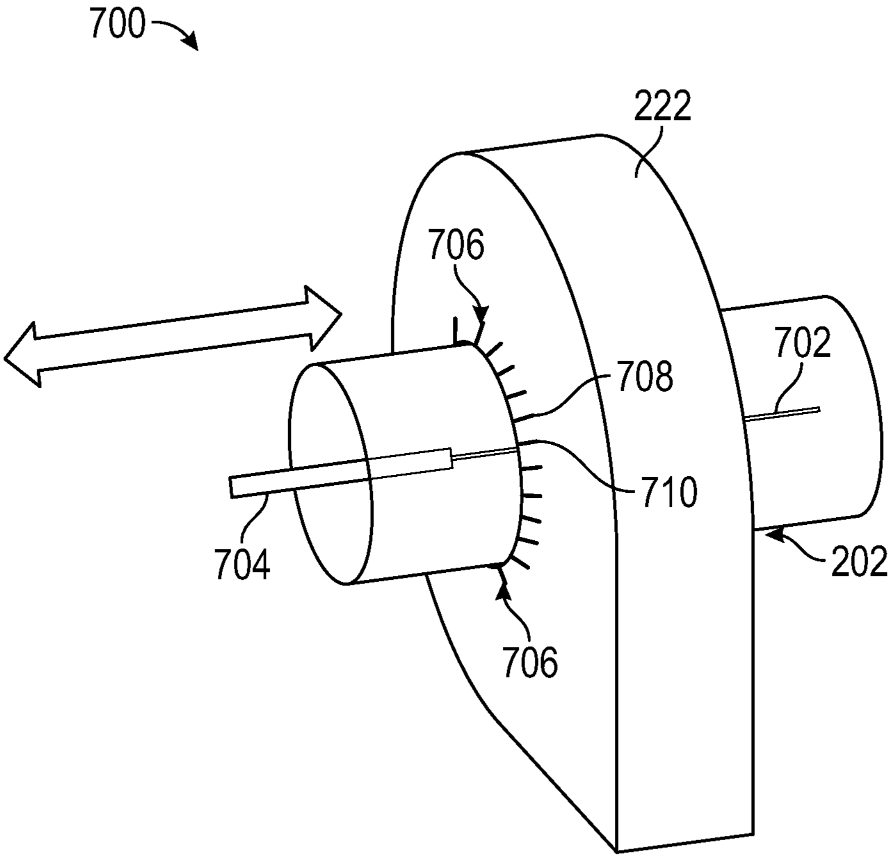
FIG. 7 shows a perspective view of a section of the cam shaft that includes a cam.

FIG. 7 shows a perspective view 700 of a section of the cam shaft 220 that includes a cam. The cam shaft 220 includes a longitudinal groove or pin rail 702 that extends along a section of the cam shaft. A gear pin 704 resides within the pin rail 702 and can be moved to a selected position within the pin rail. The cam includes a hole through which the cam shaft passes. The cam is disposed along the cam shaft such that the pin rail 702 passes through at least a portion of the cam. A plurality of cam grooves 706 extending radially outward from the hole at a plurality of angular locations.

In operation, the gear pin 704 is disposed within one of the cam grooves (e.g., first cam groove 708) to secure the cam to the cam shaft 220. The cam shaft 220 can then be rotated to rotate the cam to apply a selected force to the pressure plate 214, FIG. 2. The relative angular position between the cam and the cam shaft can be adjusted by sliding the gear pin 704 through the pin rail 702 away from the cam until it exits the first cam groove 708. The cam is then rotated with respect to the cam shaft 220 or the cam shaft is rotated with respect to the cam until the pin rail 702 is aligned with another of the cam grooves (e.g., second cam groove 710). The gear pin 704 is then slid through the pin rail 702 to engage the cam at the second cam groove 710.

Figure 8:
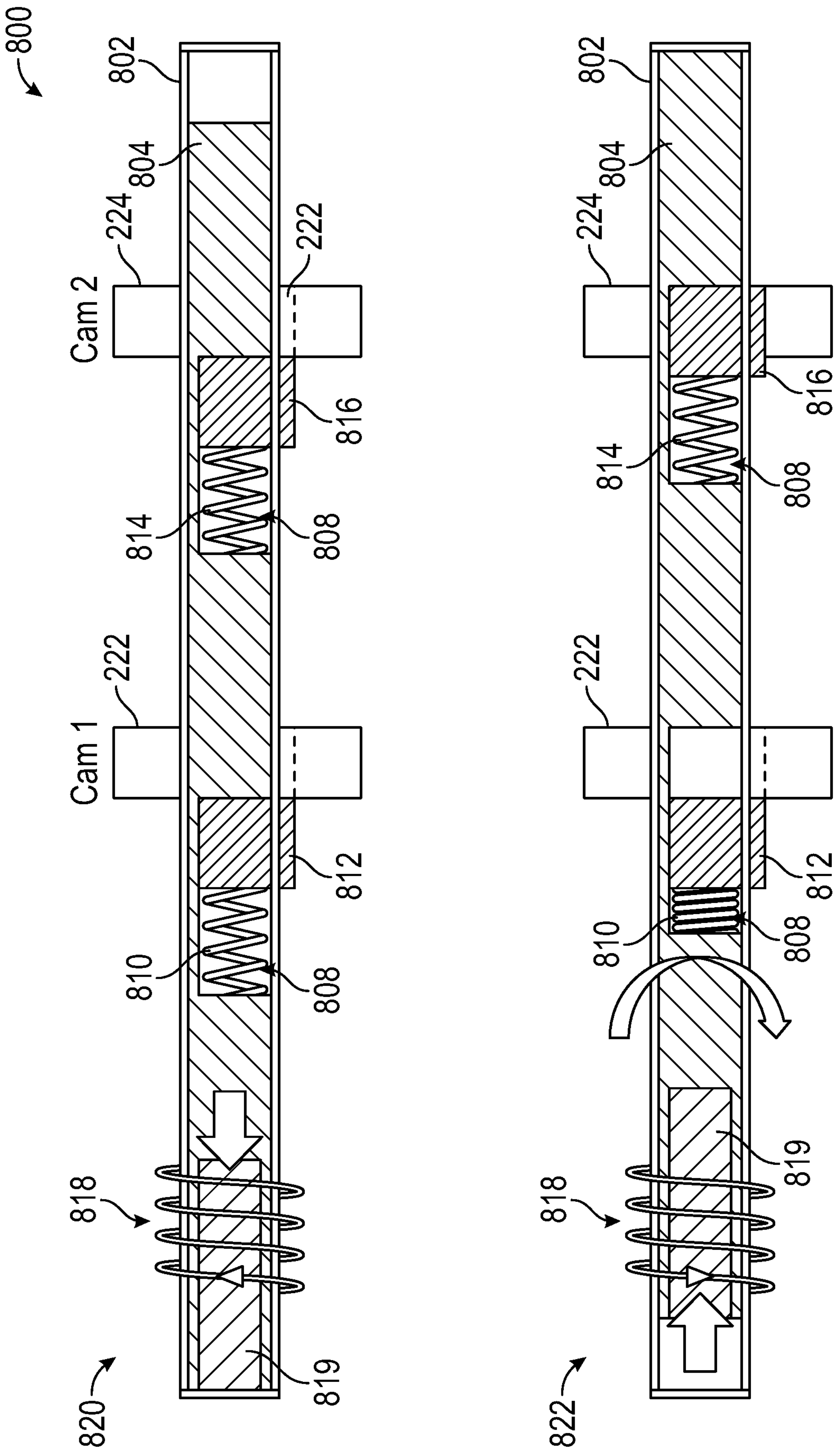
FIG. 8 shows a side view of the cam shaft illustrating an apparatus for engaging the cam to the cam shaft.

FIG. 8 shows a side view 800 of the cam shaft 220 illustrating an apparatus for engaging the cam to the cam shaft 220. The cam shaft 220 includes a cam housing 802 and a core 804 slidable within the cam housing 802. The core 804 includes a first cavity 806 located at one side of the first cam 222 and a second cavity 808 located at one side of the second cam 224. A first gear pin 810 is disposed in the first cavity 806 with a first spring 812 that biases the first gear pin toward the first cam 222. A second gear pin 816 is disposed in the second cavity 808 with a second spring 814 that biases the second gear pin toward the second cam 224.

A solenoid 818 is disposed at an end of the cam shaft 220. The core 804 includes a magnetic material 819 that lies within the solenoid 818. When the solenoid 818 is turned off, the core 804 is in a first axial position within the cam housing 802 in which the first cavity 806 and the second cavity 808 are away from the first cam 222 and the second cam 224, respectively.

When the solenoid 818 is turned on (first configuration 820), the core 804 is forced into a second axial position within the cam housing in which the first cavity 806 is moved toward the first cam 222 and the second cavity 808 is moved toward the second cam 224. As shown, the first cam 222 is rotated at an angle in which the first gear pin 810 is not aligned with any of the cam grooves of the first cam. Thus, the first spring 812 compresses, but the first gear pin 810 does not engage with the first cam 222. The cam shaft can be however rotated to align the first gear pin 810 with a selected cam groove, at which time the first spring 812 will bias the first gear pint into the selected cam groove to engage the first cam 222. Also, the second cam 224 is rotated at an angle in which the second gear pin 816 is aligned with a cam groove of the second cam 224. Thus, the second spring 814 is able to bias the second gear pin 816 to engage with the second cam 224.

Referring again to FIG. 2, since the angular position of a cam with respect to the cam shaft 220 can be selected, the first cam 222 and the second cam 224 can have different angular positions. For example, the first cam 222 can be set at a first angle $\theta$ and the second cam 224 can be set at a second angle (e.g., $\theta+5°$). In this configuration, upon a same rotation of the cam shaft 220, the second cam 224 can apply more force to the pressure plate than the first cam 222. Thus, a differential force and pressure can be applied across the movable plate and at different locations in the battery.

Figure 9:
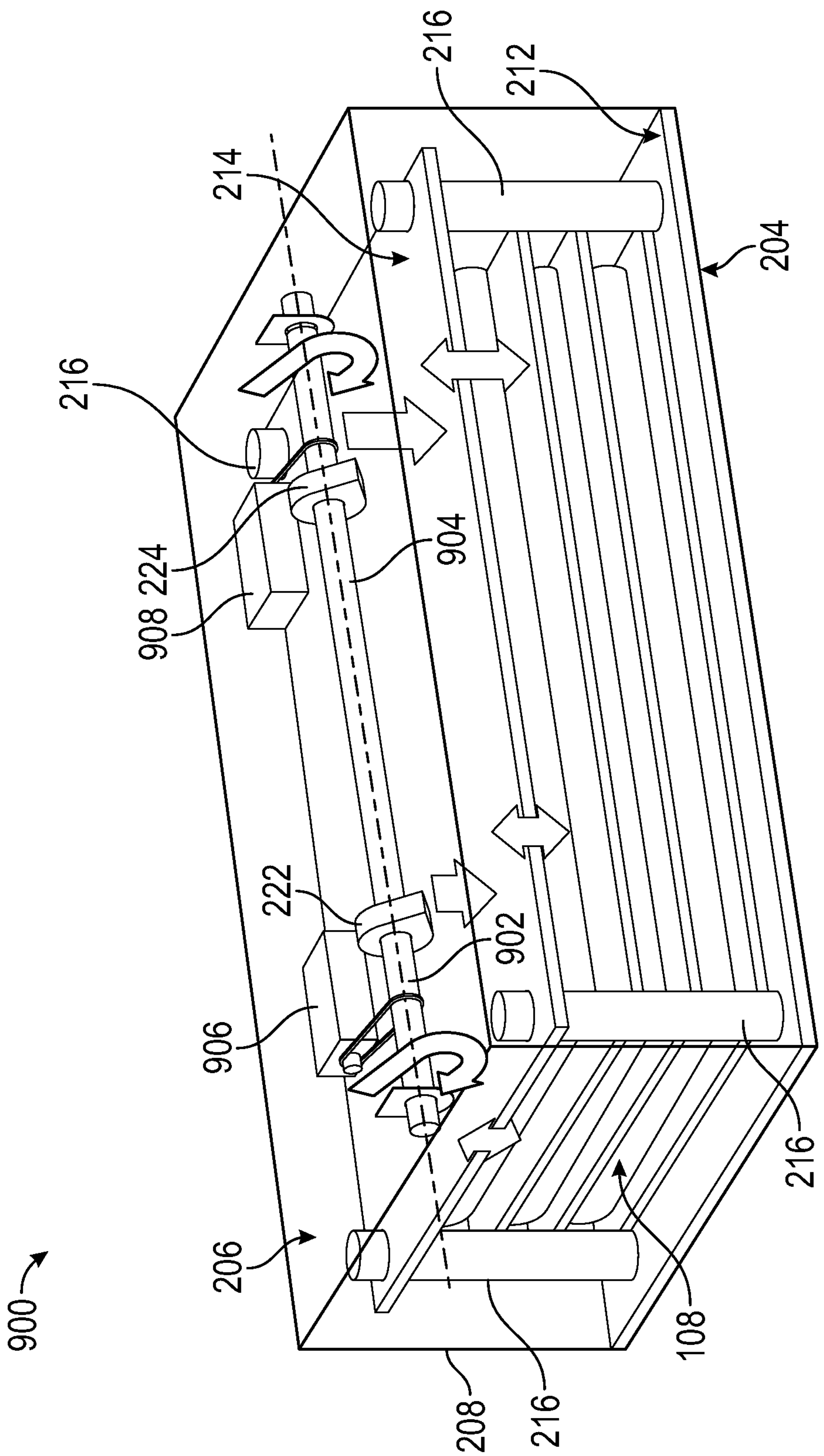
FIG. 9 shows a perspective view of the battery system in another embodiment.

FIG. 9 shows a perspective view 900 of the battery system 200 in another embodiment. The cam shaft 220 includes a first section 902 that includes the first cam 222 and a second section 904 that includes the second cam 224. The first section 902 and the second section 904 can be rotated independently of each other. A first motor 906 is coupled to the first section 902 and a second motor 908 is coupled to the second section 904. The first motor 906 and the second motor 908 can be operated independently to provide different rotations of their first cam 222 and the second cam 224, respectively. Thus, different pressures can be applied at different locations within the battery 108. It is understood that the cam shaft 220 can have more than two independently rotating sections with each section including its own cam, in various embodiments.

Figure 10:
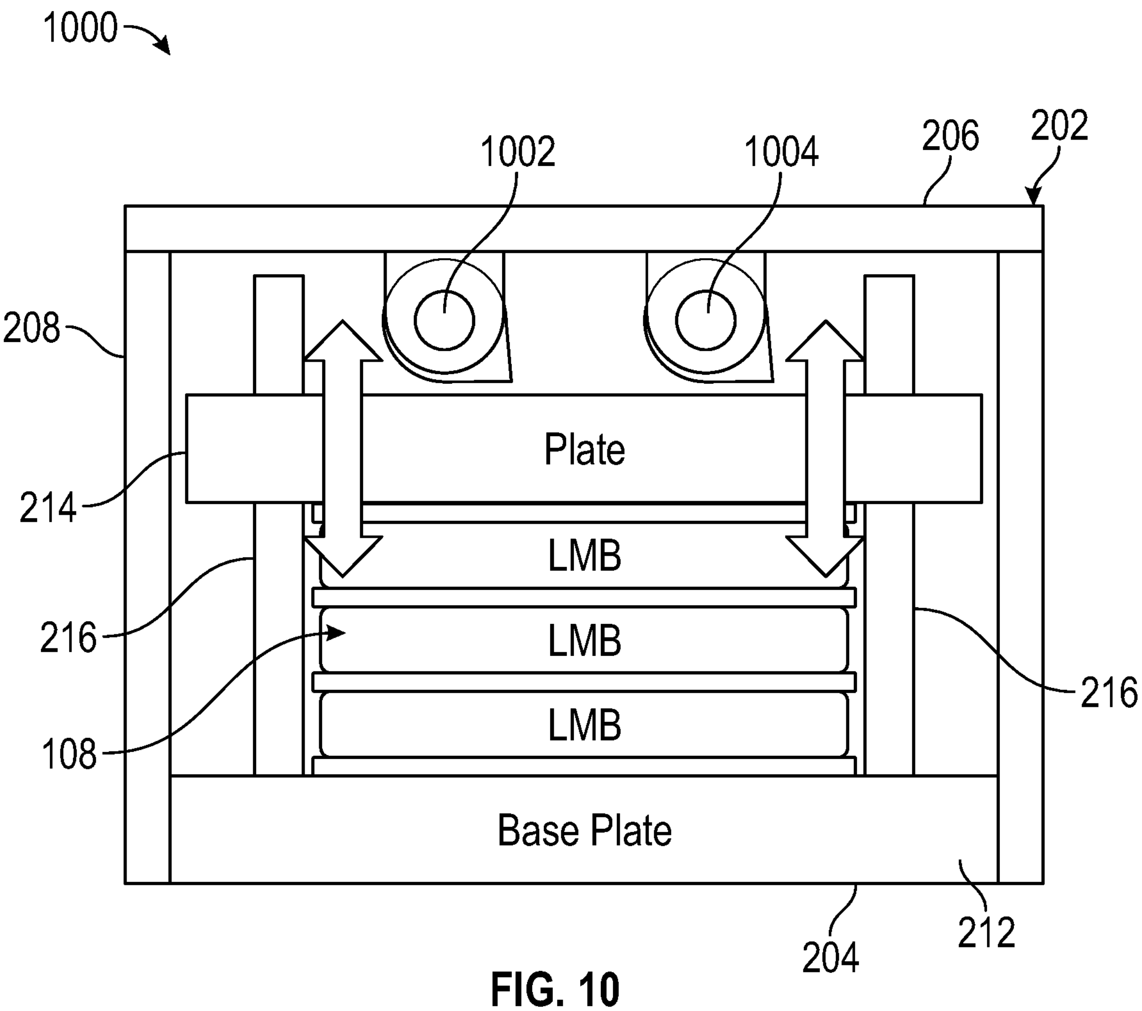
FIG. 10 shows a side view of the battery system.

FIG. 10 shows a side view 1000 of the battery system 200. The side view shows a first cam shaft 1002 and a second cam shaft 1004 at different locations along the pressure plate 214. The cam shafts can be placed to provide a desired to pressure at different locations along the pressure plate. Each cam shaft can be rotated independently. It is understood that there can be more than two cam shafts, in various embodiments.

The terms “a” and “an” do not denote a limitation of quantity, but rather denote the presence of at least one of the referenced item. The term “or” means “and/or” unless clearly indicated otherwise by context. Reference throughout the specification to “an aspect”, means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being “on” another element, it can be directly on the other element or intervening elements may also be present. In contrast, when an element is referred to as being “directly on” another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A pressure control device for controlling a pressure at a battery of a vehicle, comprising:

a support plate at a first side of the battery;

a pressure plate disposed at a second side of the battery opposite the first side, the pressure plate movable with respect to the support plate to control the pressure of the battery;

a cam disposed at the pressure plate and configured to rotate to move the pressure plate with respect to the support plate;

a cam shaft configured to rotate the cam to move the pressure plate; and a motor configured to generate a rotation at the cam shaft.

2. The pressure control device of claim 1, wherein the cam shaft is held at a fixed location with respect to the support plate.

3. The pressure control device of claim 1, wherein the motor generates the rotation at the cam shaft via one of: (i) a rotor shaft rotated by the motor and a flexible belt connecting the rotor shaft to the cam shaft to convert a rotation of the rotor shaft to the rotation of the cam shaft; and (ii) the cam shaft acting as the rotor shaft of the motor.

4. The pressure control device of claim 1, wherein the cam includes a first cam and a second cam, wherein the first cam and the second cam can be selectively rotated to apply a differential pressure across the pressure plate.

5. The pressure control device of claim 4, wherein the first cam is set at a first angle with respect to the cam shaft and the second cam is set at a second angle with respect to the cam shaft that is different from the first angle.

6. The pressure control device of claim 4, wherein the cam shaft includes a first section including the first cam and a second section including the second cam, wherein the first section and the second section are rotatable independently of each other.

7. The pressure control device of claim 1, wherein the cam includes a cam groove and the cam shaft includes a pin rail having a gear pin therein that is configured to move into the cam groove to engage the cam shaft to the cam.

8. The pressure control device of claim 7, further comprising a solenoid at the cam shaft for controlling an axial location of the gear pin with respect to the cam groove.

9. A method of controlling an operation of a battery of an electric vehicle, comprising:

rotating a cam against a pressure plate to cause the pressure plate to move with respect to a support plate, wherein the battery is disposed between the support plate at a first side of the battery and the pressure plate at a second side of the battery opposite the first side and wherein moving the pressure plate with respect to the support plate adjusts a pressure within the battery, wherein a motor rotates a camshaft to rotate the cam.

10. The method of claim 9, further comprising rotating the cam by rotating a cam shaft at a fixed location with respect to the support plate.

11. The method of claim 10, further comprising rotating the cam shaft via a motor, wherein one of: (i) a rotor shaft rotated by the motor is coupled to the rotor shaft via flexible belt; and (ii) the cam shaft is directly rotated by the motor.

12. The method of claim 10, wherein the cam includes a cam groove and the cam shaft includes a pin rail having a gear pin therein, further comprising moving the gear pin into the cam groove to engage the cam shaft to the cam.

13. The method of claim 9, wherein the cam includes a first cam and a second cam, further comprising applying a differential pressure across the pressure plate using the first cam and the second cam.

14. A vehicle, comprising:

a battery having a first side and a second side opposite the first side; and a pressure control device, comprising:

a support plate at the first side of the battery;

a pressure plate at the second side of the battery, the pressure plate movable with respect to the support plate to control a pressure of the battery;

a cam disposed at the pressure plate and configured to rotate to move the pressure plate with respect to the support plate;

a cam shaft configured to rotate the cam to move the pressure plate; and a motor configured to generate a rotation at the cam shaft.

15. The vehicle of claim 14, wherein the cam shaft is held at a fixed location with respect to the support plate.

16. The vehicle of claim 14, wherein the motor generates the rotation at the cam shaft via one of: (i) a rotor shaft rotated by the motor and a flexible belt connecting the rotor shaft to the cam shaft to convert a rotation of the rotor shaft to the rotation of the cam shaft; and (ii) the cam shaft acting as the rotor shaft of the motor.

17. The vehicle of claim 14, wherein the cam includes a first cam and a second cam, wherein the first cam and the second cam can be selectively rotated to apply a differential pressure across the pressure plate.

18. The vehicle of claim 17, wherein the first cam is set at a first angle with respect to the cam shaft and the second cam is set at a second angle with respect to the cam shaft that is different from the first angle.

19. The vehicle of claim 14, wherein the cam includes a cam groove and the cam shaft includes a pin rail having a gear pin therein that is configured to move into the cam groove to engage the cam shaft to the cam.

20. The vehicle of claim 19, further comprising a solenoid at the cam shaft for controlling an axial location of the gear pin with respect to the cam groove.

* * * * *